(12) United States Patent
Sugiura

(10) Patent No.: US 8,603,929 B2
(45) Date of Patent: *Dec. 10, 2013

(54) PROCESS FOR PRODUCING HEXAGONAL ZIRCONIUM PHOSPHATE POWDER

(75) Inventor: Koji Sugiura, Nagoya (JP)

(73) Assignee: FUJIFILM Corporation, Tokyo (JP)

( * ) Notice: Subject to any disclaimer, the term of this patent is extended or adjusted under 35 U.S.C. 154(b) by 658 days.

This patent is subject to a terminal disclaimer.

(21) Appl. No.: 12/742,678

(22) PCT Filed: Nov. 12, 2008

(86) PCT No.: PCT/JP2008/070563
§ 371 (c)(1),
(2), (4) Date: May 13, 2010

(87) PCT Pub. No.: WO2009/063891
PCT Pub. Date: May 22, 2009

(65) Prior Publication Data
US 2010/0267544 A1    Oct. 21, 2010

(30) Foreign Application Priority Data
Nov. 14, 2007 (JP) ................. 2007-295115

(51) Int. Cl.
*C04B 35/447* (2006.01)
*C04B 35/486* (2006.01)

(52) U.S. Cl.
USPC ........................................ 501/102

(58) Field of Classification Search
None
See application file for complete search history.

(56) References Cited

U.S. PATENT DOCUMENTS

| 3,709,706 A | * | 1/1973 | Sowman ................. 501/103 |
| 4,112,194 A | * | 9/1978 | Chenot et al. ............. 428/690 |
| 4,256,718 A | | 3/1981 | McArthur et al. |
| 4,360,507 A | * | 11/1982 | McArthur et al. ......... 423/420.2 |
| 6,627,164 B1 | * | 9/2003 | Wong ........................ 423/71 |
| 2001/0002246 A1 | * | 5/2001 | Huguenin et al. ............ 423/511 |

FOREIGN PATENT DOCUMENTS

| JP | 62-59054 B2 | 12/1987 |
| JP | 3-83905 A | 4/1991 |
| JP | 6-53566 B2 | 7/1994 |
| JP | 2767276 B2 | 6/1998 |
| JP | 2000-290007 A | 10/2000 |

(Continued)

OTHER PUBLICATIONS

Ota, Toshitaka et al. "Low-Thermal-Expansion KZr2(PO4)3 Ceramic", Journal of the Ceramic Society of Japan, 1987, vol. 95, No. 5, p. 531-537.

(Continued)

*Primary Examiner* — Emily Le
*Assistant Examiner* — Jenny Wu
(74) *Attorney, Agent, or Firm* — Birch, Stewart, Kolasch & Birch, LLP

(57) ABSTRACT

The present invention is a process for easily producing a hexagonal zirconium phosphate powder having excellent dispersibility and a specific particle size distribution by the use as a starting material of a zirconium carbonate powder for which a specific particle size is easily obtainable. A hexagonal zirconium phosphate powder having a specific particle size distribution and high crystallinity can be produced by making zirconium carbonate be present in an aqueous solution containing phosphate ion and at least one of ion selected from an alkali metal ion, an alkaline earth metal ion, and ammonium ion, aging by a wet method, and then heating under dry conditions.

9 Claims, 2 Drawing Sheets

(56) References Cited

FOREIGN PATENT DOCUMENTS

| JP | 3211215 | B2 | 9/2001 |
| JP | 3384412 | B2 | 3/2003 |
| JP | 2006-306676 | A | 11/2006 |
| JP | 2006306676 | A * | 11/2006 |

OTHER PUBLICATIONS

International Search Report-PCT/JP2008/070563, dated Feb. 10, 2009.

* cited by examiner

PROCESS FOR PRODUCING HEXAGONAL ZIRCONIUM PHOSPHATE POWDER

TECHNICAL FIELD

The present invention relates to a process for producing a hexagonal zirconium phosphate powder, employing a zirconium carbonate powder as a starting material. In accordance with the present invention, a highly crystalline hexagonal zirconium phosphate powder having a specific particle size can be easily obtained, and the powder thus obtained may be used as a low thermal expansion filler added to a glass sealing material for a plasma display (PDP), a fluorescent display tube, etc. or as a starting material for a silver-based inorganic antimicrobial agent.

BACKGROUND ART

With regard to zirconium phosphate, there are amorphous form and crystalline forms having a 2-dimensional lamellar structure or a 3-dimensional network structure. Among them, a hexagonal zirconium phosphate having a 3-dimensional network structure is excellent in terms of heat resistance, chemical resistance, radiation resistance, low thermal expansion, etc., and the application thereof to immobilization of radioactive waste, solid electrolytes, gas absorption/separation agents, catalysts, antimicrobial agent starting materials, low thermal expansion fillers, etc. has been investigated.

Hexagonal zirconium phosphates with various components are known so far, and examples thereof include $NaZr_2(PO_4)_3$, $CaZr_4(PO_4)_6$, and $KZr_2(PO_4)_3$ (ref. e.g. Patent Document 1, Non-Patent Document 1).

In general, with regard to a method for synthesizing these zirconium phosphates, a calcination method in which synthesis is carried out by mixing starting materials by a dry method and then calcining using a calcining furnace, etc. at 1000° C. or greater (ref. e.g. Patent Document 2, Patent Document 4), a hydrothermal method in which synthesis is carried out by mixing starting materials in water or in a water-containing state and then heating while applying pressure, a wet method in which synthesis is carried out by mixing starting materials in water and then heating at normal pressure (ref. e.g. Patent Document 3), etc. are known.

Among these synthetic methods, in the calcination method, since uniform mixing of starting materials is not easy it is difficult to obtain a zirconium phosphate having a uniform composition. Furthermore, after crystallization by calcining, it is necessary to carry out classification after grinding in order to obtain a powder having a specific particle size, and there are therefore the problems in terms of quality and productivity that the shape and the particle size of the powder are not easily stabilized and the yield is low. In particular, since the hardness of a highly crystalline zirconium phosphate is high, in order to obtain a powder with high purity, there is the problem that grinding conditions such as selection of materials for a grinder and grinding time are restricted.

On the other hand, in accordance with the wet method and the hydrothermal method, although it is easy to obtain a uniform zirconium phosphate powder, that obtained is mainly a microparticulate crystalline powder having a size of 1 μm or less, and it is technically difficult to obtain mainly a crystalline powder having a particle size of greater than 1 μm. Furthermore, using sieving of large particles from microparticles obtained by the wet method or the hydrothermal method results in high cost and is not economical.

[Patent Document 1] Japanese Patent No. 2767276
[Patent Document 2] JP-A-2000-290007 (JP-A denotes a Japanese unexamined patent application publication)
[Patent Document 3] Japanese Patent No. 3211215
[Patent Document 4] JP-A-3-83905
[Non-Patent Document 1] Shigetaka Ohota and Iwao Yamai, 'Teinetsubocho $KZr_2(PO_4)_3$ Seramikku no Sakusei' (Preparation of low thermal expansion $KZr_2(PO_4)_3$ ceramic), Journal of the Ceramic Society of Japan, 1987, Vol. 95, No. 5, p 531-537.

DISCLOSURE OF INVENTION

Problems to be Solved by the Invention

The object of the present invention is to provide a production process that can easily give a hexagonal zirconium phosphate powder having high crystallinity with a specific particle size.

Means for Solving the Problems

As a result of an intensive investigation by the present inventor in order to solve the above-mentioned problems, it has been found that a hexagonal zirconium phosphate powder having both a specific particle size distribution and high crystallinity can be easily obtained by carrying out a first step of dispersing zirconium carbonate in an aqueous solution containing phosphate ion and at least one of ion selected from an alkali metal ion, an alkaline earth metal ion, and ammonium ion and thermally aging by a wet method, and a second step of heating by a dry method, and the present invention has thus been accomplished.

Effects of the Invention

With regard to the process for producing a hexagonal zirconium phosphate powder of the present invention, compared with a conventional production process by a wet method, a hydrothermal method, or a calcination method, crystals having a specific particle size distribution can be easily produced without the necessity for a grinding or classifying step. Furthermore, the hexagonal zirconium phosphate powder obtained by the production process of the present invention has a considerably larger particle size and a smaller specific surface area than those of crystals obtained by the conventional production processes employing a wet method or a hydrothermal method, it does not cause aggregation, etc. and has excellent dispersion processability in various materials. It is particularly suitable as an additive for various types of uses as a low thermal expansion filler used in an electronic component such as a Braun tube, a plasma display (PDP), or a fluorescent display tube, and as a starting material for a silver-based inorganic antimicrobial agent.

BEST MODE FOR CARRYING OUT THE INVENTION

The present invention is explained below. Here, % means mass %.

The production process of the present invention comprises a step of dispersing a zirconium carbonate powder in an aqueous solution containing phosphate ion and at least one of ion selected from an alkali metal ion, an alkaline earth metal ion, and ammonium ion and aging by a wet method, and a step of subsequently heating by a dry method, the material obtained by the production process of the present invention being a hexagonal zirconium phosphate powder represented by Formula [1] below.

$$M_a Zr_b Hf_c(PO_4)_3 \cdot nH_2O \quad [1]$$

In Formula [1], M is at least one of ion selected from an alkali metal ion, an alkaline earth metal ion, ammonium ion, and hydrogen ion, a, b, and c are numbers, with $1.75 < b+c < 2.25$, that satisfy $a+4(b+c)=9$ when M is monovalent and that satisfy $2a+4(b+c)=9$ when M is divalent, a and b are positive numbers, c is 0 or a positive number, and n is 0 or a positive number of 2 or less.

When M is a mixture of monovalent and divalent ions, a is appropriately multiplied by a coefficient according to the ratio of monovalent M to divalent M. For example, if the molar ratio of monovalent M to divalent M is 40/60, a in the equation $a+4(b+c)=9$ may be replaced by $(40/100+2\times(60/100))a$.

In Formula [1], a preferred value for a in the case of an alkali metal ion, ammonium ion, or hydrogen ion differs from that in the case of an alkaline earth metal ion.

In the case of an alkali metal ion, ammonium ion, or hydrogen ion only, a is a positive number of less than 2, preferably 0.7 to 1.2, and more preferably 0.75 to 1.0. On the other hand, in the case of an alkaline earth metal ion only, a is a positive number of less than 1, preferably 0.35 to 0.6, and more preferably 0.4 to 0.5.

b and c in Formula [1] are numbers that satisfy $1.75 < b+c < 2.25$ and $a+4(b+c)=9$. b is greater than 1.75 but no greater than 2.1, preferably at least 1.85 but no greater than 2.07, and more preferably at least 1.9 but no greater than 2.03. c is preferably no greater than 0.2, more preferably 0.01 to 0.2, and yet more preferably 0.015 to 0.15.

n in Formula [1] is preferably no greater than 1, more preferably 0.01 to 0.5, and yet more preferably in the range of 0.03 to 0.3. When n is greater than 2, the absolute amount of moisture contained in the hexagonal zirconium phosphate powder of the present invention is large, and there is a possibility of foaming or hydrolysis occurring at the time of heating, etc. when it is added to various materials.

A zirconium carbonate powder that can be used as a starting material for synthesis of the hexagonal zirconium phosphate powder of the present invention is preferably sparingly soluble in water or insoluble in water. Specifically, the solubility in ion exchanged water at room temperature (20° C.) is preferably less than (0.5 g/100 g of water), and more preferably less than (0.1 g/100 g of water). Furthermore, with regard to the particle size distribution of the zirconium carbonate powder, it is preferable that particles having a particle diameter of at least 1 μm but no greater than 500 μm comprise at least 95% of the total on a volumetric basis, it is more preferable that those of 1 to 50 μm comprise at least 50% on a volumetric basis, and it is yet more preferable that those of 3 to 30 μm comprise at least 50% on a volumetric basis. Measurement of particle diameter may be carried out preferably by any method such as a laser diffraction type particle size distribution analyzer, a centrifugal sedimentation type particle size distribution analyzer, a Coulter counter, or counting using an electron microscope, etc. Among them, use of a laser diffraction type particle size distribution analyzer is particularly preferable, and in order to avoid the effect of aggregation, measurement is preferably carried out by dispersing a powder in water or an organic solvent.

Among these sparingly water-soluble or water-insoluble zirconium carbonate powders, a zirconium carbonate represented by Formula [2] below is more preferable.

$$eZrO_2 \cdot CO_2 \cdot xH_2O \quad [2]$$

In Formula [2], e is a positive number, and x is 0 or a positive number. Furthermore, e is preferably at least 0.2 but no greater than 5, and e is particularly preferably selected from 0.5, 2, and 3 since a stable compound is obtained. The present invention can be carried out for any value of x, but it is preferably at least 0.1 but no greater than 30 and, since a stable compound is easily obtained is more preferably at least 8 but no greater than 25 and yet more preferably at least 15 but no greater than 20. The value of x may be determined by a general method such as thermal desorption gas analysis or pyrolysis gas chromatography, but the present invention may be carried out without determining the value. In this case, the number of moles may be calculated by determining the chemical composition of a zirconium carbonate by a normal chemical analysis such as X ray fluorescence analysis.

Specific examples of the zirconium carbonate include $3ZrO_2 \cdot CO_2 \cdot xH_2O$, which is called 'zirconium (IV) carbonate, basic' (English name Zirconium IV Carbonate, basic), $ZrO_2 \cdot 2CO_2 \cdot xH_2O$, which is called 'zirconium dicarbonate' (English name Zirconium Dicarbonate), and $2ZrO_2 \cdot CO_2 \cdot xH_2O$, which is called 'zirconium (IV) carbonate hydroxide oxide' (English name Zirconium IV Carbonate Hydroxide Oxide). In addition thereto, a double salt containing ammonium, sodium, potassium, etc. may be used. In the present invention, among zirconium carbonates represented by Formula [2], three types, that is, $ZrO_2 \cdot 2CO_2 \cdot xH_2O$, in which e is 0.5, $2ZrO_2 \cdot CO_2 \cdot xH_2O$, in which e is 2, and $3ZrO_2 \cdot CO_2 \cdot xH_2O$, in which e is 3, are preferable. Furthermore, the zirconium carbonate in the present invention preferably comprises hafnium. The amount of hafnium may be changed by metallurgical techniques, and from the viewpoint of good reactivity and economically low cost the mass of hafnium is preferably at least 0.2% but no greater than 5% relative to the mass of the total zirconium carbonate powder.

In the present invention, an aqueous solution for dispersing the zirconium carbonate is an aqueous solution containing phosphate ion and at least one of ion selected from an alkali metal ion, an alkaline earth metal ion, and ammonium ion.

Examples of alkali metal ions that can be used as starting materials for synthesis of the hexagonal zirconium phosphate powder of the present invention include lithium, sodium, potassium, rubidium, cesium, etc. ions. Since it is necessary for compounds containing these metal ions to be water soluble, a chloride, a hydroxide, a nitrate, a sulfate, a carbonate, etc. can be used, and a hydroxide is preferable since the pH of an aqueous solution is adjustable. Among them, preferred examples of the alkali metal ions include sodium ion and potassium ion, and as compounds there are sodium hydroxide and potassium hydroxide. Furthermore, examples of alkaline earth metal ions that can be used in the present invention include magnesium, calcium, strontium, barium, etc. ions, and magnesium ion and calcium ion are preferable. Moreover, as necessary for an application, etc., another transition metal ion may be copresent as appropriate.

When synthesizing the hexagonal zirconium phosphate powder of the present invention, the molar ratio (zirconium compound being defined as 1) of the alkali metal ion, alkaline earth metal ion, and ammonium ion to the zirconium carbonate is at least 0.3 but less than 0.8, preferably at least 0.3 but less than 0.7, and more preferably at least 0.35 but no greater than 0.6.

As a phosphate ion source that can be used as a starting material for synthesis of the hexagonal zirconium phosphate powder of the present invention, any material may be used as long as phosphate ion is generated by ionization in water. Specific examples thereof include phosphoric acid, sodium phosphate, potassium phosphate, ammonium phosphate, metaphosphoric acid, polyphosphoric acid, and phosphorus pentoxide; an alkali metal salt, alkaline earth metal salt, or ammonium salt of phosphoric acid, or phosphoric acid is preferable, and phosphoric acid is particularly preferable. The concentration when phosphoric acid is used as a starting material is preferably on the order of 60% to 85% as a concentration by weight. Whichever of the phosphorus compounds is used, phosphate ion is generated in aqueous solution.

Since phosphoric acid has a low degree of ionization, not all the phosphoric acid present in an aqueous solution is present as phosphate ion, and the phosphate ion source and phosphate ion are in a state of ionization equilibrium. Furthermore, hydrogen phosphate ion and dihydrogen phosphate ion are also generated simultaneously in a state of equilibrium, the ratio thereof present depending on the pH of the aqueous solution. When the above-mentioned phosphate ion source is made to be present in water, since phosphate ion is always generated, an aqueous solution containing the phosphate ion source is the same as an aqueous solution containing phosphate ion.

The concentration of zirconium carbonate powder dispersed in water or an aqueous solution is not particularly limited as long as a uniform dispersion can be achieved; when the concentration is low the viscosity is low and mixing by stirring is easy, whereas when the concentration is high the productivity per unit volume increases, the concentration by weight being preferably 5% to 40%, and more preferably 10% to 30%. The molar ratio of phosphoric acid to zirconium carbonate (zirconium compound being defined as 1) is, since high crystallinity can be obtained, preferably 1.1 to 1.7, more preferably 1.2 to 1.6, and yet more preferably 1.3 to 1.5.

In addition to the above-mentioned conditions, the aqueous solution for dispersing the zirconium carbonate is preferably an aqueous solution having a pH of 0.5 to 6 in which at least one of ion selected from an alkali metal ion, an alkaline earth metal ion, and ammonium ion is copresent. The pH is more preferably 1 to 2.

A hexagonal zirconium phosphate powder having a preferred particle size distribution is obtained by dispersing a zirconium carbonate in an aqueous solution that satisfies the above conditions and thermally aging in an aqueous solution dispersion state. Since, unlike hexagonal zirconium phosphate crystals, it is easy to adjust the particle size of zirconium carbonate, the technical point of the production process of the present application is that a hexagonal zirconium phosphate powder having a preferred particle size distribution is obtained by using as a starting material a zirconium carbonate having a particle size distribution with mainly coarse particles of about 1 to 50 μm, and limiting the conditions so that the particle size does not change greatly during the reaction with phosphoric acid.

A method for dispersing a zirconium carbonate powder in water or an aqueous solution in the present invention is not limited, and any method may be employed such as a method in which a zirconium carbonate powder is added to an aqueous solution containing phosphate ion and at least one of ion selected from an alkali metal ion, an alkaline earth metal ion, and ammonium ion, a method in which an aqueous solution containing phosphate ion and at least one of ion selected from an alkali metal ion, an alkaline earth metal ion, and ammonium ion is added to water in which a zirconium carbonate powder has been dispersed, or a method in which a compound as a source for the above ion is added to water in which a zirconium carbonate powder has been dispersed.

After starting materials are mixed, heating is desirably carried out while stirring so that the starting materials are mixed homogeneously and the reaction proceeds uniformly. This is called thermal aging; the time therefor is not limited, and since the shorter the time the higher the productivity but the longer the time the more stable the crystallinity, it is preferably 10 minutes to 24 hours, and more preferably 1 hour to 10 hours.

The temperature of thermal aging is preferably at least 40° C., more preferably at least 60° C., yet more preferably at least 70° C., and particularly preferably at least 80° C. Above 40° C., the higher the aging temperature is, the more easily a highly crystalline hexagonal zirconium phosphate powder is obtained, and the shorter the aging time. The upper limit of the aging temperature is 100° C. under normal pressure, and can exceed 100° C. if pressure is applied. However, a preferred upper limit is 200° C. since high temperature and high pressure result in high cost in terms of equipment.

The hexagonal zirconium phosphate thus thermally aged is filtered, washed well with ion exchanged water, and then heated by a dry method as a second step of the present invention. The dry method generally means handling conditions in which water or a solvent is not present, but in the second step of the present invention it means an environment in which moisture can be evaporated and a powder can be heated in a dry state. The maximum temperature for heating is preferably at least 650° C. but no greater than 1500° C., more preferably at least 700° C. but no greater than 1450° C., and yet more preferably at least 800° C. but no greater than 1400° C. The heating time, when the time for increasing the temperature is included, is not limited but it is preferably at least 1 hour but no greater than 24 hours at the maximum temperature, more preferably at least 2 hours but no greater than 18 hours, and yet more preferably at least 4 hours but no greater than 15 hours. Usual high temperature treatment equipment inevitably has temperature unevenness, and the present invention can be carried out even when there is an error between the set maximum temperature and the temperature that a powder actually reaches of plus or minus 100° C., and preferably 50° C. For temperature measurement, other than measurement equipment such as a thermocouple installed in heating equipment, temperature indicating means such as a pyrometric chip may be used.

The rate of temperature increase until reaching the maximum temperature is preferably at least 0.1° C./minute but no greater than 50° C./minute. Before reaching the maximum temperature for dry heating, a step of evaporating moisture at a temperature of no greater than 600° C. may be added as a drying step, and drying may be accelerated by reducing the pressure.

Any general heating method such as a rotary kiln, an electric furnace, or a gas furnace may be used in the dry heating step, and in order to prevent a skin layer from being formed on the surface, heating may be carried out while making it flow or applying stirring. A hexagonal zirconium phosphate powder comprising highly pure white crystals is obtained by lightly grinding after heating. In accordance with the production process of the present invention, there is hardly any necessity to carry out grinding and classifying since the primary particle size can be controlled and, moreover, sintering does not easily occur.

With regard to the particle size of the hexagonal zirconium phosphate obtained by the production process of the present invention, it is preferable that particles of at least 1 μm but no greater than 500 μm comprise at least 95% on a volumetric basis, it is more preferable that those of 1 to 55 μm comprise at least 50% on a volumetric basis, and it is yet more preferable that those of 3 to 40 μm comprise at least 50% on a volumetric basis. Furthermore, the median diameter on a volumetric basis is 5 to 35 μm, and preferably 10 to 30 μm.

The hexagonal zirconium phosphate obtained by the production process of the present invention is highly crystalline. The crystallinity of a hexagonal zirconium phosphate may be determined from the peak intensity due to hexagonal zirconium phosphate crystals by powder X ray diffraction. The peak intensity at 2θ=30.3°, which is a peak due to hexagonal zirconium phosphate detected by powder X ray analysis, is at least 500 cps, preferably at least 1000 cps, more preferably at least 1500 cps, and yet more preferably at least 1800 cps. When the peak intensity is 500 cps or less, since sufficient crystallinity is not obtained, there is extensive degradation in performance related to crystallinity such as low thermal expansion.

The hexagonal zirconium phosphate obtained by the production process of the present invention has high purity. The purity of a hexagonal zirconium phosphate can be assured by confirming the presence or absence of impurity peaks other than the peak due to hexagonal zirconium phosphate crystals by powder X ray diffraction or by confirming the amount of component contained by X ray fluorescence analysis. The total of components due to hexagonal zirconium phosphate detected by X ray fluorescence analysis is preferably at least 96%, and more preferably at least 99%.

As the composition of the hexagonal zirconium phosphate powder obtained by the production process of the present invention, those below can be cited as examples.

$K_{1.16}Zr_{1.92}Hf_{0.04}(PO_4)_3$ $KZr_{1.96}Hf_{0.04}(PO_4)_3$ $K_{1.08}Zr_{1.86}Hf_{0.12}(PO_4)_3$ $K_{0.82}H_{0.34}Zr_{1.92}Hf_{0.04}(PO_4)_3$ $K_{0.6}H_{0.3}Zr_{2.0}Hf_{0.025}(PO_4)_3 \cdot 0.1H_2O$ $Na_{0.72}K_{0.28}Zr_{1.88}Hf_{0.12}(PO_4)_3 \cdot 0.2H_2O$ $Na_{0.3}K_{0.4}H_{0.24}Zr_{2.0}Hf_{0.015}(PO_4)_3 \cdot 0.1H_2O$ $Na_{1.2}Zr_{1.93}Hf_{0.02}(PO_4)_3 \cdot 0.1H_2O$ $H_{1.2}Zr_{1.88}Hf_{0.07}(PO_4)_3 \cdot 0.11H_2O$ $H_{0.92}Zr_{1.95}Hf_{0.07}(PO_4)_3 \cdot 0.11H_2O$ The usage of the hexagonal zirconium phosphate obtained by the production process of the present invention is not particularly limited, and it may be mixed with another component or composited with another material as appropriate according to the intended application. For example, it may be used in various forms such as a powder, a powder-containing dispersion, powder-containing particles, a powder-containing paint, a powder-containing fiber, a powder-containing plastic, and a powder-containing film.

Application

The hexagonal zirconium phosphate powder of the present invention may be used as an inorganic ion exchanger as a starting material for a silver-based antimicrobial agent or for immobilization of radioactive waste and, in addition, may be used in a catalyst, a ceramics starting material, etc. Furthermore, it may be used as a low thermal expansion filler that is effective for controlling the thermal expansion of a sealing glass used as a sealing material for a Braun tube, a plasma display panel, a fluorescent display tube, a field emission display (FED), and an electronic component of a high reliability package, etc. equipped with a device such as a semiconductor integrated circuit, a crystal oscillator, or a SAW (surface acoustic wave) filter, etc.

EXAMPLES

The present invention is explained below by reference to Examples, but the present invention is not limited thereby.

Purity was measured using an X ray fluorescence analyzer and is expressed as wt % of components due to hexagonal zirconium phosphate in the components detected.

Peak intensity cps at 2θ=30.3° C. by powder X ray diffraction was measured from the height of a diffraction peak after reduction of background, using a powder X ray diffraction analyzer employing a copper target X ray tube as an irradiation source.

Median diameter was analyzed on a volumetric basis using a laser diffraction type particle size distribution analyzer.

Example 1

Synthesis of Na Type Hexagonal Zirconium Phosphate 0.1 mol of zirconium (IV) carbonate hydroxide oxide ($2ZrO_2 \cdot CO_2 \cdot xH_2O$) containing 2.1% hafnium, for which particles having a particle diameter of at least 1 μm but no greater than 500 μm were 99.4% of the total on a volumetric basis, was suspended in 300 mL of ion exchanged water, and 0.28 mol of phosphoric acid was added thereto while stirring. Furthermore, 0.09 mol of sodium hydroxide was made into a 20% concentration aqueous solution and added to the above, the temperature was then raised at 1° C./minute, and aging was carried out at 98° C. for 2 hours. Subsequently, a precipitate thus obtained was washed well and dried at 120° C. After drying, heating was carried out using an electric furnace at 1100° C. for 8 hours, thus synthesizing a hexagonal zirconium phosphate powder. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1. A chart of the powder X ray diffraction is shown in FIG. 1, and the value for peak intensity at 2θ=30.3° was read out by a data analyzer and found to be 1980 cps. Hereinafter, values for the peak intensity at 2θ=30.3° in Examples and Comparative Examples other than Comparative Example 4 were also read out using a data analyzer in the same manner.

Example 2

Synthesis 1 of K Type Hexagonal Zirconium Phosphate 0.1 mol of zirconium (IV) carbonate hydroxide oxide ($2ZrO_2 \cdot CO_2 \cdot xH_2O$) containing 2.1% hafnium, for which particles having a particle diameter of at least 1 μm but no greater than 500 μm were 99.4% of the total on a volumetric basis, was suspended in 300 mL of ion exchanged water, and 0.28 mol of phosphoric acid was added thereto while stirring. Furthermore, 0.09 mol of potassium hydroxide was made into a 20% concentration aqueous solution and added to the above, the temperature was then raised, and aging was carried out at 98° C. for 2 hours. Subsequently, a precipitate thus obtained was washed well and dried at 120° C. After drying, heating was carried out using an electric furnace at 1100° C. for 8 hours, thus synthesizing a hexagonal zirconium phosphate powder. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Example 3

Synthesis 2 of K Type Hexagonal Zirconium Phosphate 0.1 mol of zirconium (IV) carbonate hydroxide oxide ($2ZrO_2.CO_2.xH_2O$) containing 2.1% hafnium, for which particles having a particle diameter of at least 1 μm but no greater than 500 μm were 99.4% of the total on a volumetric basis, was suspended in 300 mL of ion exchanged water, and 0.28 mol of phosphoric acid was added thereto while stirring. Furthermore, 0.09 mol of potassium hydroxide was made into a 20% concentration aqueous solution and added to the above, the temperature was then raised, and aging was carried out at 60° C. for 2 hours. Subsequently, a precipitate thus obtained was washed well and dried at 120° C. After drying, heating was carried out using an electric furnace at 1100° C. for 8 hours, thus synthesizing a hexagonal zirconium phosphate powder. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Example 4

Synthesis 3 of K Type Hexagonal Zirconium Phosphate 0.1 mol of zirconium (IV) carbonate hydroxide oxide ($2ZrO_2.CO_2.xH_2O$) containing 2.1% hafnium, for which particles having a particle diameter of at least 1 μm but no greater than 500 μm were 99.4% of the total on a volumetric basis, was suspended in 300 mL of ion exchanged water, and 0.28 mol of phosphoric acid was added thereto while stirring. Furthermore, 0.09 mol of potassium hydroxide was made into a 20% concentration aqueous solution and added to the above, the temperature was then raised, and aging was carried out at 60° C. for 2 hours. Subsequently, a precipitate thus obtained was washed well and dried at 120° C. After drying, heating was carried out using an electric furnace at 800° C. for 8 hours, thus synthesizing a hexagonal zirconium phosphate powder. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Example 5

Synthesis 4 of K Type Hexagonal Zirconium Phosphate 0.2 mol of zirconium dicarbonate ($ZrO_2.2CO_2.xH_2O$) containing 1.8% hafnium, for which particles having a particle diameter of at least 1 μm but no greater than 500 μm were 99.1% of the total on a volumetric basis, was suspended in 300 mL of ion exchanged water, and 0.28 mol of phosphoric acid was added thereto while stirring. Furthermore, 0.09 mol of potassium hydroxide was made into a 20% aqueous solution and added to the above, the temperature was then raised to 98° C., and aging was carried out for 2 hours. Subsequently, a precipitate thus obtained was washed well and dried at 120° C. After drying, heating was carried out using an electric furnace at 1100° C. for 8 hours, thus synthesizing a hexagonal zirconium phosphate. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Example 6

Synthesis 5 of K Type Hexagonal Zirconium Phosphate 0.67 mol of zirconium (IV) carbonate, basic ($3ZrO_2.CO_2.xH_2O$) containing 1.6% hafnium, for which particles having a particle diameter of at least 1 μm but no greater than 500 μm were 98.4% of the total on a volumetric basis, was suspended in 300 mL of ion exchanged water, and 0.28 mol of phosphoric acid was added thereto while stirring. Furthermore, 0.09 mol of potassium hydroxide was made into a 20% aqueous solution and added to the above, the temperature was then raised to 98° C., and aging was carried out for 2 hours. Subsequently, a precipitate thus obtained was washed well and dried at 120° C. After drying, heating was carried out using an electric furnace at 1100° C. for 8 hours, thus synthesizing a hexagonal zirconium phosphate. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Example 7

Synthesis of Ca Type Hexagonal Zirconium Phosphate 0.67 mol of zirconium (IV) carbonate, basic ($3ZrO_2.CO_2.xH_2O$) containing 1.6% hafnium, for which particles having a particle diameter of at least 1 μm but no greater than 500 μm were 98.4% of the total on a volumetric basis, was suspended in 300 mL of ion exchanged water, and 0.28 mol of phosphoric acid was added thereto while stirring. Furthermore, 0.045 mol of calcium chloride was made into a 20% aqueous solution and added to the above, the temperature was then raised to 98° C., and aging was carried out for 2 hours. Subsequently, a precipitate thus obtained was washed well and dried at 120° C. After drying, heating was carried out using an electric furnace at 1100° C. for 8 hours, thus synthesizing a hexagonal zirconium phosphate. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Comparative Example 1

Synthesis of Hexagonal Zirconium Phosphate Using Water-Soluble Zr Starting Material 0.2 mol of zirconium oxychloride containing 1.6% hafnium was dissolved in 300 mL of ion exchanged water, and 0.3 mol of phosphoric acid was added thereto while stirring. Furthermore, 0.1 mol of potassium hydroxide was made into a 20% aqueous solution and added to the above, the temperature was then raised to 98° C., and aging was carried out for 2 hours. Subsequently, a precipitate thus obtained was washed well and dried at 120° C. After drying, heating was carried out using an electric furnace at 1100° C. for 8 hours, thus synthesizing a hexagonal zirconium phosphate. Since this hexagonal zirconium phosphate was hard, it was difficult to break up by a mortar. The results of measurement of purity by X ray fluorescence analysis and peak intensity cps at 2θ=30.3° by powder X ray diffraction of the hexagonal zirconium phosphate thus obtained are shown in Table 1.

Comparative Example 2

Wet Synthesis of Hexagonal Zirconium Phosphate Using Water-Soluble Zr Starting Material 0.1 mol of oxalic acid and 0.2 mol of zirconium oxychloride containing 1.6% hafnium were dissolved in 300 mL of ion exchanged water, and 0.3 mol of phosphoric acid was added thereto while stirring. Furthermore, 0.1 mol of potassium hydroxide was made into a 20% aqueous solution and added to the above, the temperature was then raised to 98° C., and aging was carried out for 2 hours. Subsequently, a precipitate thus obtained was washed well and dried at 120° C., thus synthesizing a hexagonal zirconium phosphate. This hexagonal zirconium phosphate could easily be broken up by a mortar, and the results of measurement of purity by X ray fluorescence analysis, peak intensity cps at 2θ=30.3° by powder X ray diffraction, and median diameter are shown in Table 1.

Comparative Example 3

Synthesis by Calcining of Hexagonal Zirconium Phosphate 0.2 mol of zirconium oxide containing 1.6% of hafnium, 0.3 mol of ammonium dihydrogen phosphate, and 0.1 mol of potassium carbonate were mixed in a ball mill, and calcining was carried out stepwise using an electric furnace at 200° C. for 4 hours, 900° C. for 4 hours, and 1400° C. for 4 hours, thus synthesizing a hexagonal zirconium phosphate. Since this hexagonal zirconium phosphate was hard, it was difficult to break up by a mortar. The results of measurement of purity by X ray fluorescence analysis and peak intensity cps at 2θ=30.3° by powder X ray diffraction of the hexagonal zirconium phosphate thus obtained are shown in Table 1.

Comparative Example 4

Synthesis of Na Type Amorphous Zirconium Phosphate 0.1 mol of zirconium (IV) carbonate hydroxide oxide ($2ZrO_2.CO_2.xH_2O$) containing 2.1% hafnium, for which particles having a particle diameter of at least 1 μm but no greater than 500 μm were 99.4% of the total on a volumetric basis, was suspended in 300 mL of ion exchanged water, and 0.28 mol of phosphoric acid was added thereto while stirring. Furthermore, 0.09 mol of sodium hydroxide was made into a 20% concentration aqueous solution and added to the above, the temperature was then raised at 1° C./minute, and aging was carried out at 98° C. for 2 hours. Subsequently, a precipitate thus obtained was washed well and dried at 120° C. The results of measurement of purity by X ray fluorescence analysis, peak intensity cps at 2θ=30.3° by powder X ray diffraction, and median diameter of the dried zirconium phosphate are shown in Table 1. A chart of the powder X ray diffraction is shown in FIG. 2, and since there was no peak at 2θ=30.3°, the peak intensity was defined as 0.

TABLE 1

| | Purity/% | Peak intensity at 2θ = 30.3° C./cps | Median diameter |
|---|---|---|---|
| Example 1 | 99.8 | 1980 | 22.7 μm |
| Example 2 | 99.7 | 2310 | 23.5 μm |
| Example 3 | 99.7 | 2030 | 24.2 μm |
| Example 4 | 99.8 | 1840 | 22.3 μm |
| Example 5 | 99.9 | 1980 | 20.7 μm |
| Example 6 | 99.9 | 2120 | 28.7 μm |
| Example 7 | 99.8 | 760 | 20.7 μm |
| Comparative Example 1 | 95.3 | 2270 | — |
| Comparative Example 2 | 99.8 | 2190 | 0.2 μm |
| Comparative Example 3 | 94.1 | 2010 | — |
| Comparative Example 4 | 99.8 | 0 | 25.1 μm |

In Comparative Example 1 and Comparative Example 3, since hard, large zirconium phosphate lumps having a particle diameter of at least a few mm were formed, particle size distribution could not be measured. On the other hand, as is clear from Table 1, the hexagonal zirconium phosphate powder obtained by the production process of the present invention has high purity and high crystallinity even without carrying out grinding and classifying steps, and coarse particles can be adjusted so as to have a particle size in a preferred range. Furthermore, Comparative Example 4 shows that a hexagonal zirconium phosphate powder having high crystallinity cannot be obtained by a production process that does not comprise a dry heating step, even using the same starting materials as those of the invention of the present application.

Industrial Applicability

The present invention provides a production process that easily gives a hexagonal zirconium phosphate powder having high crystallinity at a specific particle size. The hexagonal zirconium phosphate obtained in accordance with the present invention can be used as an inorganic ion exchanger for immobilization of radioactive waste ion or as a starting material for a silver-based inorganic antimicrobial agent and, in addition, can be used in various applications such as low thermal expansion fillers and catalysts, while exploiting its particle size and ion exchange properties.

Explanation of Reference Numerals and Symbols

Figure 1:
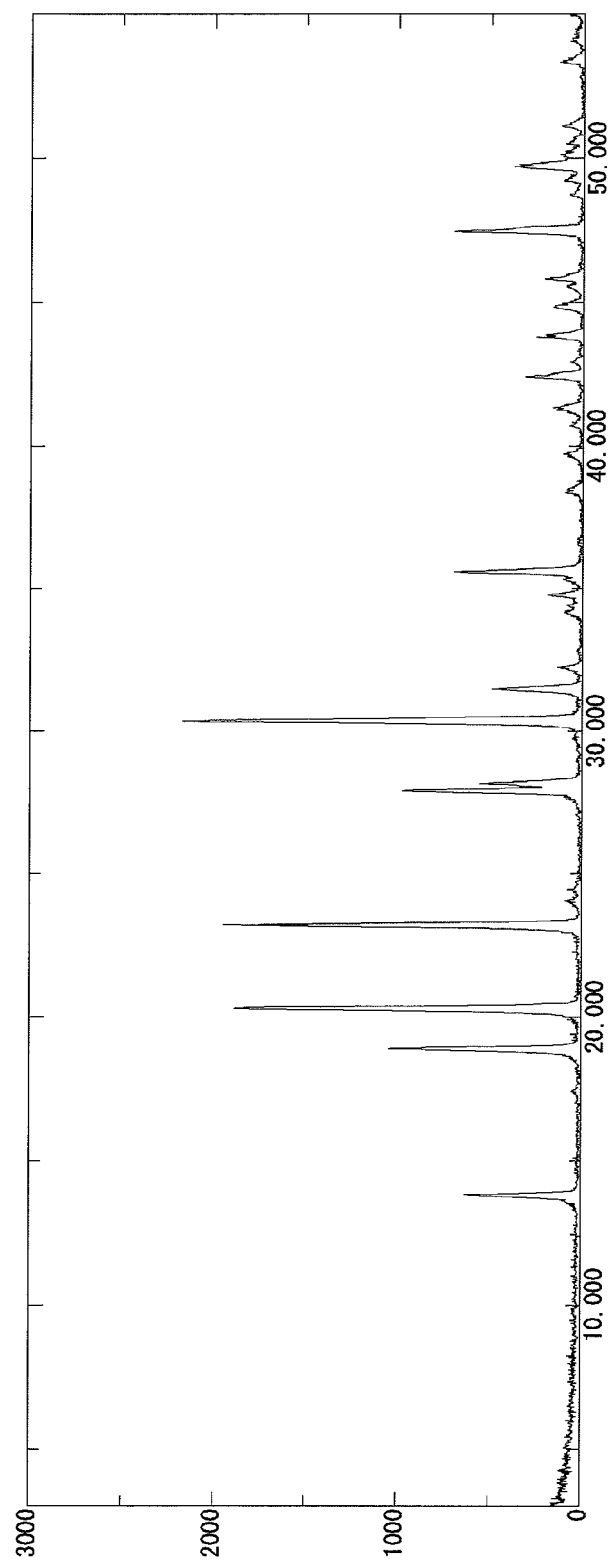
[FIG. 1] An X ray diffraction chart of hexagonal zirconium phosphate obtained in Example 1 measured using a powder X ray diffractometer.
Figure 2:
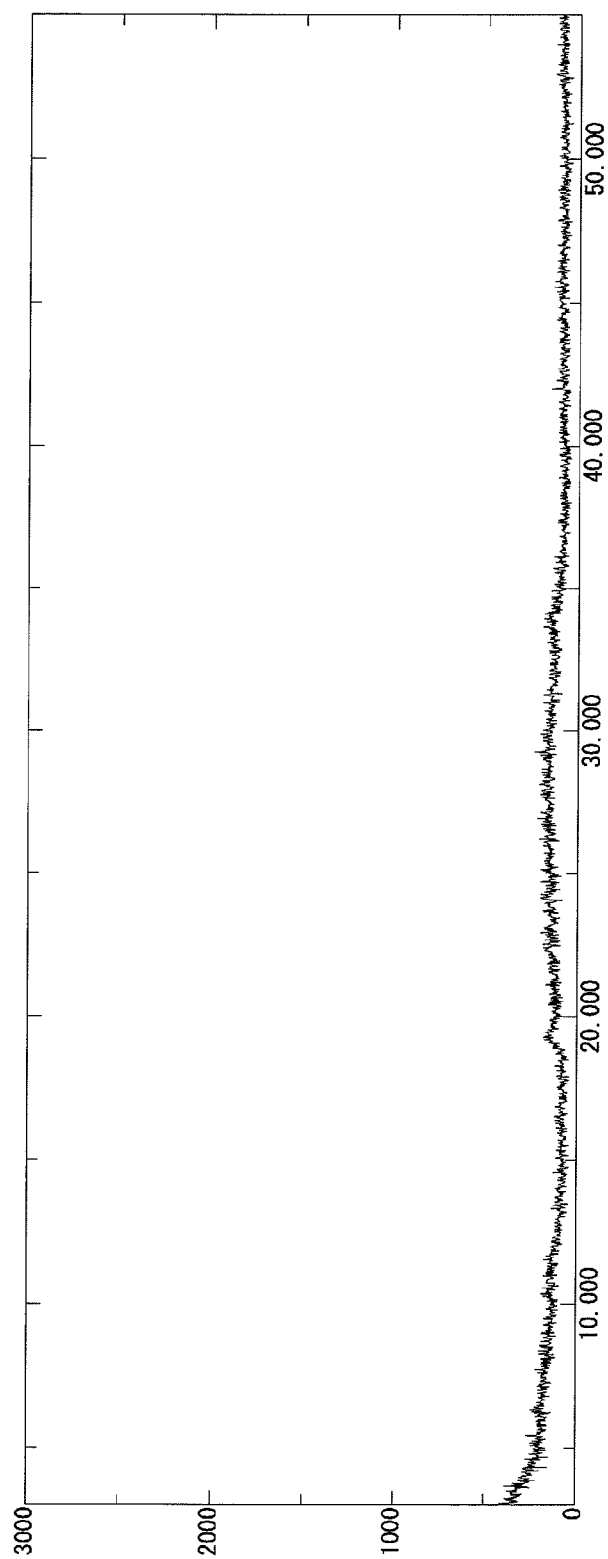
[FIG. 2] An X ray diffraction chart of hexagonal zirconium phosphate obtained in Comparative Example 4 measured using a powder X ray diffractometer.

The ordinate (scale 0 to 3000) of FIG. 1 and FIG. 2 denotes X ray intensity (units: cps) in a powder X ray diffraction measurement.

The abscissa (scale 0 to 50.000) of FIG. 1 and FIG. 2 denotes X ray diffraction angle 2θ (units: °).

The invention claimed is:

1. A process for producing a hexagonal zirconium phosphate powder represented by Formula [1] below, comprising a first step of dispersing a zirconium carbonate powder containing hafnium in an aqueous solution comprising phosphate ion and at least one of ion selected from an alkali metal ion, an alkaline earth metal ion, and ammonium ion, and thermally aging by a wet method, and a second step of heating by a dry method;

$$M_aZr_bHf_c(PO_4)_3 \cdot nH_2O \qquad [1]$$

in Formula [1], M denotes at least one of ion selected from an alkali metal ion, an alkaline earth metal ion, ammonium ion, and hydrogen ion, a, b, and c are numbers, with $1.75 < b+c < 2.25$, that satisfy $a+4(b+c)=9$ when M is monovalent and that satisfy $2a+4(b+c)=9$ when M is divalent, a and b are positive numbers, c is 0.01 to 0.2, and n is 0 or a positive number not greater than 2.

2. The process for producing a hexagonal zirconium phosphate powder according to claim 1, wherein the zirconium carbonate powder in the first step has a particle size distribution such that particles having a particle diameter by laser diffraction type particle size distribution analyzer of at least 1 μm but no greater than 500 μm comprise at least 95% of the total on a volumetric basis.

3. The process for producing a hexagonal zirconium phosphate powder according to claim 1, wherein the zirconium carbonate powder in the first step comprises, relative to its mass, at least 0.2% but no greater than 5% of hafnium.

4. The process for producing a hexagonal zirconium phosphate powder according to claim 1, wherein the second step of heating by a dry method comprises a step of heating at a maximum temperature of at least 800° C. but no greater than 1400° C. for at least 4 hours but no greater than 15 hours.

5. The process for producing a hexagonal zirconium phosphate powder according to claim 1, wherein the zirconium carbonate powder in the first step is sparingly soluble in water or insoluble in water with a solubility in ion exchanged water at 20° C. of less than 0.5 g/100 g of water.

6. The process for producing a hexagonal zirconium phosphate powder according to claim 1, wherein a molar ratio of an alkali metal ion, an alkaline earth metal ion, and ammonium ion in the aqueous solution to zirconium carbonate of the zirconium carbonate powder is at least 0.3 but less than 0.8.

7. The process for producing a hexagonal zirconium phosphate powder according to claim 1, wherein a molar ratio of phosphoric acid as a source for phosphate ion in the aqueous solution to zirconium carbonate of the zirconium carbonate powder is 1.1 to 1.7.

8. The process for producing a hexagonal zirconium phosphate powder according to claim 1, wherein the aqueous solution for dispersing the zirconium carbonate powder in the first step has a pH of 0.5 to 6.

9. The process for producing a hexagonal zirconium phosphate powder according to claim 1, wherein in the first step a time for thermal aging is 10 minutes to 24 hours and a temperature of thermal aging is at least 40° C. but no greater than 200° C.

* * * * *

UNITED STATES PATENT AND TRADEMARK OFFICE
CERTIFICATE OF CORRECTION

| | | |
|---|---|---|
| PATENT NO. | : 8,603,929 B2 | Page 1 of 1 |
| APPLICATION NO. | : 12/742678 | |
| DATED | : December 10, 2013 | |
| INVENTOR(S) | : Koji Sugiura | |

It is certified that error appears in the above-identified patent and that said Letters Patent is hereby corrected as shown below:

ON THE TITLE PAGE:

At item (73), correct the identity of the Assignee as follows:

Change: "FUJIFILM Corporation, Tokyo (JP)"

To: --Toagosei Co., Ltd, Tokyo (JP)--.

Signed and Sealed this
Twentieth Day of May, 2014

Michelle K. Lee
*Deputy Director of the United States Patent and Trademark Office*